Jan. 3, 1967    J. DIMEFF    3,295,360
DYNAMIC SENSOR

Filed April 21, 1965    3 Sheets-Sheet 1

INVENTOR.
JOHN DIMEFF

BY
ATTORNEYS

Jan. 3, 1967

J. DIMEFF 3,295,360

DYNAMIC SENSOR

Filed April 21, 1965

INVENTOR.
JOHN DIMEFF

BY
ATTORNEYS

Jan. 3, 1967  J. DIMEFF  3,295,360
DYNAMIC SENSOR

Filed April 21, 1965  3 Sheets-Sheet 3

INVENTOR.
JOHN DIMEFF

BY
ATTORNEYS

United States Patent Office 3,295,360
Patented Jan. 3, 1967

---

3,295,360
DYNAMIC SENSOR
John Dimeff, San Jose, Calif., assignor to the United States of America as represented by the Administrator of the National Aeronautics and Space Administration
Filed Apr. 21, 1965, Ser. No. 449,902
18 Claims. (Cl. 73—30)

This is a continuation-in-part of application Serial No. 231,046, filed October 16, 1962, now abandoned.

The invention described herein may be manufactured and used by and for the United States of America for governmental purposes without the payment of any royalties thereon or therefor.

This invention relates to improved devices for the transformation of physical forces into mechanical and electrical responses for measuring the forces involved, and, in particular, this invention relates to a device for measuring the density of a gaseous environment, or, under conditions where the composition and temperature are known, a device which will measure the presence of the gaseous environment.

In the practice and in the literature comprising the prior art there have been described many different techniques for measuring the density and pressure of gases. One general class of these instruments exposes a diaphragm to the action of the pressure of the gaseous atmosphere to be measured, for example, and measures the deflection of this diaphragm by capacitive, inductive or resistance displacement sensors. This general class of instruments is adversely affected by the environment to the extent that the damping variations caused by fluctuations in density of the gas being measured and the compressibility and initial effects of the gas being measured cause a variation in the dynamic response of the system. This effect is normally most pronounced at frequencies near the natural frequency of the diaphargm and any related or coupled mechanical system. Consequently, errors in phase or in amplitude arising from pressure variations, as indicated by the transducer, are at a maximum at or near the natural frequency of the system. A further limitation and characteristic of conventional transducers of this class is that they have a limited ability to measure small, constant pressures because of the dimensional instability of the system. For example, in a conventional capacitive-type transducer the spacing between the vibrating diaphragm and the stationary reference plate may be fixed at five thousandths of an inch. In order to measure forces which would cause a displacement of the order of one micro-inch, the five thousandth inch spacing would necessarily have to remain stable within better than one part in five thousand. This stability is difficult to achieve over a wide range of temperature, and particularly difficult to maintain in the presence of temperature gradients. Further limitations, which appear in this general class of instruments, are that they are dependent on construction techniques, which require a large gauge volume, and thereby are characterized by long time lags at low pressures.

The present invention differs from the previously mentioned conventional transducer in that its sensitive element is a vibrating member, preferably a thin, metallic diaphragm or an elongated ribbon, maintained at a constant vibrational amplitude under radial or axial tension, respectively, which is preferably adjustable; and the gas whose pressure is to be measured fills a small, relatively enclosed space on each side of the vibrating member. This arrangement largely avoids the disadvantages of the earlier types of gauges. Furthermore, the new and improved transducer of this invention utilizes the effects of the gaseous environment on the dynamic characteristics of the vibrating member to measure the density or pressure of the environment itself.

The vibrating member, above referred to, and comprising the sensitive element of the transducer herein, is driven at the resonant frequency of the system by induced electrostatic forces applied between the vibrating member and a stationary unit in close proximity to one side of the vibrating member. As the pressure of the gas sample in the spaces between the moving part and the stationary parts is varied, the work done by the vibrating member in overcoming the losses associated with the motion and compression of the gas also varies, and a varying driving energy is supplied, depending upon the pressure or density of the surrounding gas. This driving energy, required to keep the system oscillating at a fixed amplitude, is measured and the energy is related as a function of pressure or density to the pressure or density of the gas in the sensing volume.

This mode of operation of this invention takes advantage of the resistance of the measured gas to be compressed or expanded. Thus, by narrowly confining the volume surrounding the sensitive vibrating member, that member will cause the environmental gas to compress and to expand during the time the vibrating member makes its cyclical, dynamic excursions. Because of the resistance of the gas to this compression and expansion, the action of the gas is much the same as would be the action of an additional spring, which would tend to resist the motion of the vibrating member from its rest position. That is to say, the gas tends to increase the effective stiffness of the dynamic system. Since the gases in proximity to the vibrating member must also be accelerated, they tend also to increase the effective mass of the dynamic system.

With proper design the effect of one (or the other) of these terms may be made greater than the effect of the other. For example, when the increased stiffness of the dynamic system is greater than the increase in the effective mass, the increased stiffness will be more than great enough to compensate for the additional mass introduced by the environmental gas, and the natural frequency of the system will be directly proportional to the pressure of the environmental gas. If, on the other hand, the increase in the effective mass of the environmental gas in greater than the increase in the stiffness of the system, the increase in mass will affect the system's dynamics to a greater extent than the increase in stiffness, and the natural frequency of the dynamic system will be inversely proportional to the pressure of the environmental gas. In either event, in the preferred embodiments of this invention, a measure of the gas pressure is obtained by measuring the voltage required to drive the dynamic system and relating this voltage to the characteristics of the gas surrounding the diaphragm.

Other modes of operation of the present invention may also be employed. For example, the change in frequency of the dynamic system may be related to the pressure, or the dynamic amplitude of the vibrating member may be measured by a position sensor. In the latter case, a relationship may then be derived between the constant driving force, the variable amplitude of vibration and the density of the environmental gas which is to be measured.

There is a prior art device for measuring gas pressure which also involves a diaphragm that is continuously vibrated. The diaphragm is driven by a sinusoidal electrically controlled driving force; the actual vibratory motion of the diaphragm is detected, and the difference in phase between the input energy for vibrating the diaphragm and the actual resultant vibration is measured to indicate the pressure of gas adjacent the diaphragm.

Such devices are relatively insensitive because the difference in phase between the input and the resultant output is largely a function of a number of parameters of the mechanical system and is affected in only a relatively minor way by the gas pressure.

In addition, the sensitivity of the prior art device is inherently low because the diaphragm must be vibrated at a frequency other than its resonant frequency. As a result, relatively large forces are required to drive the diaphragm, and the small force differential exerted by change in gas pressure causes a relatively insignificant change in the difference between the phase of the driving force and the phase of the actual vibration of the diaphragm. In practice, the prior art device is operated by driving the diaphragm above resonant frequency. The reason the prior art method of measuring phase shift between force and displacement cannot operate at resonant frequency is that when a system is vibrated at resonant frequency, the phase shift between force and displacement is always 90°.

The present invention differs from the mentioned prior vibrating-diaphragm system by measuring an effect other than the difference in phase between the diaphragm driving force and the resultant diaphragm motion. In addition, the system of the present invention can, and for maximum sensitivity does, operate at resonant frequency.

Thus, the present invention provides a dynamic sensor, or pressure measuring device, with an extremely large number of obvious operational and structural advantages and improvements over prior art sensors, many of which are delineated below, and which are set forth in separate paragraphs for clarity.

The active volume of this invention is small, thereby introducing a minimum time lag in the pressure measurement.

The resonant frequency of the sensitive, mechanical member can be made extremely high by increasing the tension thereof, thereby making the device less sensitive to the characteristic, low frequency vibrations of normal environments.

The system easily lends itself to continuous, remote indications of pressure.

The high stiffness characteristics of high frequency systems and the presence of the measured gas on both sides of the sensitive vibrating member, which eliminates damaging stresses caused by pressure differences, makes the transducer less delicate.

Because of its relatively small size, the transducer may be installed in almost any place where pressures are to be measured, for example, upon a wind tunnel model, and because of the diminutive size of this transducer, time lags associated with connecting tubes are substantially reduced.

Because of the fact that the measured gas is present on both sides of the membrane, no pressure differential exists, and the transducer responds basically to absolute magnitudes of density or pressure of the gaseous environment to be measured.

This invention provides for surrounding the sensitive vibrating member on both sides with the medium to be measured, resulting in uniform and identical heating conditions being imposed on both sides thereof, consequently reducing errors resulting from the tendency of the member to buckle, and rendering the diaphragm insensitive to the damaging effects of severe overload.

Additionally, because the resonating mechanical member can be forced to move with minimum power through displacement distances that are large in comparison with the displacements normally encountered in diaphragm-type gauges, the stability of mechanical spacings within the transducer cells need not be held to such close tolerance to obtain readings of pressure and density of very small magnitudes.

Thus, the present invention is a decided advancement in the art, and, while many of the mechanical and operational characteristics of the new transducer are extremely important, one of its most interesting practical features is its ability to measure pressure over a wide range from approximately $10^{-5}$ to $10^3$ millimeters of Hg. Furthermore, several orders of magnitude can be added to the dynamic range of the transducer by additional refinements.

Other advantages of this invention will become apparent from the following detailed description and the accompanying drawings, showing two preferred embodiments of the present invention.

Figure 1:
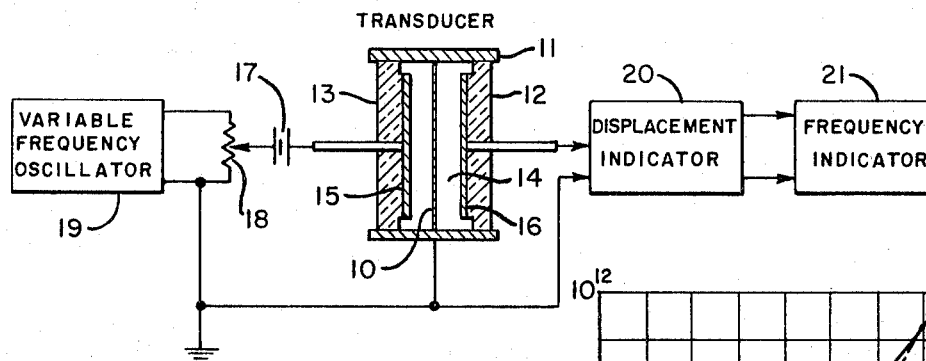
FIGURE 1 is a simplified cross-section of one embodiment of the transducer herein, with a simplified schematic representation of the apparatus for sensing the dynamic properties of the vibrating diaphragm therein.
Figure 2:
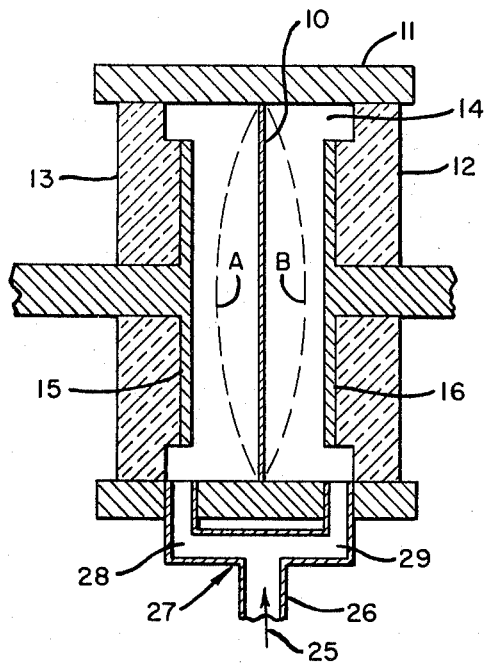
FIGURE 2 is an enlarged cross-section of the transducer element of FIG. 1.

Referring now to FIGURES 1 and 2, it may be seen that a sensitive diaphragm 10 is caused to oscillate between two limiting positions A and B by introducing means to force the vibrating member to move periodically from its rest position, preferably at the resonant frequency of the system. In the process of moving dynamically from the two extreme limiting positions A and B, representing maximum vibrational amplitude, the diaphragm 10 strikes molecules of the gas comprising the environment to be measured. In turn these molecules are accelerated. The acceleration of these molecules requires that they absorb energy from the diaphragm, and the amount of energy extracted by the gas and lost by the diaphragm is proportional to the number of molecules colliding with the diaphragm per unit time per unit area. The pressure cell of the invention may be of any desired shape or geometrical configuration and is shown as a housing assembly having a hollow, cylindrical casing or tube 11, preferably made of Kovar steel, closed at opposite ends by two similar, annular end discs 12 and 13, which are preferably made of an insulating material. For example, the discs are preferably made of glass. The cylindrical tube 11 and the end discs 12 and 13 define a hollow, cylindrical cavity 14, which is recessed along its perimeter, as shown, and which is divided by a thin, flexible, circular membrane or diaphragm 10. The diaphragm is driven at the resonant frequency of the system by utilizing various techniques in combining different arrangements of electrostatic, electromagnetic and mechanical driving apparatus. However, for the purposes of illustration, without intending to limit the scope of this invention, it should be understood that the preferred method of driving diaphragm 10 is by induced electrostatic forces applied between the diaphragm 10 and the stationary driving plate 15, which is in close proximity to the diaphragm, as shown. When this is done, the diaphragm's vibrational frequency or the diaphragm displacement will be measured by measuring the change in capacitance between the diaphragm 10 and the stationary sensing plate 16, which is rigidly secured near the other side of the diaphragm.

The driving or forcing plate 15 is energized by a constant D.C. voltage and by a variable or A.C. voltage for driving the diaphragm 10, which is driven by capacitively linking the diaphragm to the driving plate. Referring to FIGURE 1, a source of D.C. current, for example a battery 17, creates a minimum D.C. biasing potential between the driving plate and the diaphragm by connecting one terminal of the battery 17 to the driving plate 15, and the other terminal of the battery 17 to a potentiometer 18. The other leg of potentiometer 18 is, in turn, connected to the tube 11 through ground, as shown. To induce the desired variable voltage upon the driving plate, the output leads of a variable frequency oscillator 19 are connected across the potentiometer 18, which is connected through battery 17 to the driving plate 15.

Thus, the variable frequency oscillator 19 will impress an A.C. voltage over the constant D.C. voltage. This A.C. voltage is manually varied to drive the diaphragm at a constant vibrational amplitude at preferably the resonant frequency of the system, and the variance of the voltage may be directly read at the A.C. frequency oscillator to provide a reading of the density or pressure of the gas within cavity 14.

Means are also provided for determining when the diaphragm 10 is vibrating at a constant vibrational amplitude and at the natural frequency of the system. To accomplish this, a second circuit is provided, wherein the diaphragm 10 and the sensing disc 16 form the two plates of another capacitor which is connected to a diaphragm displacement indicator 20, as shown. This indicator measures the diaphragm displacement by measuring the capacitance between the diaphragm and the sensing plate, and the displacement indicator 20 provides a means for determining when diaphragm amplitude is constant. The outlets of the displacement indicator 20 are directly connected to a frequency indicator 21, as shown. This frequency indicator 21 acts as a tuner for determining when the resonant frequency of the system is attained, and allows selection of the resonant frequency for optimum operation. This indicator 21 is also optionally used whenever the change in resonant frequency is employed as a measure of the pressure or density of the gaseous environment, as will be described later.

Referring now to FIGURE 2, it will be seen that the gas to be measured, indicated by the arrow 25, enters the gas inlet 26, which is connected through the T-joint 27 to channels 28 and 29. Molecules of the gas randomly enter either channel and are evenly distributed on both sides of the diaphragm. The forcing plate 15 drives the diaphragm at a constant vibrational amplitude and the changes in driving voltage are related to the pressure or density of the gas in chamber 14. As mentioned above, the forcing plate 15 is impressed with a voltage containing a term, which is independent of time and a term which varies as a function of time. For example, under one set of operating circumstances, the total voltage V, is given a value, $V = V_s + V_v \sin(wt)$ where:

V is the total voltage applied to the forcing plate 15, $V_s$ is the constant, biasing voltage applied to the forcing plate 15 by the source of direct current 17, and $V_v \sin(wt)$ is the time varying force, of frequency $w$, applied to the forcing plate by the variable frequency oscillator 19.

Since the forcing plate and the diaphragm closely approximate a parallel plate condenser, the total driving force F is proportional to the square of the voltage appearing at the forcing plate 15. Therefore, this force contains a term which is constant, a term which contains the product of the constant voltage and the time varying voltage, and a term which contains the square of the time varying voltage. By properly choosing the dimensional characteristics of the diaphragm and forcing plate, all but the second of these terms may be disregarded. Thus, as attention is turned to the second term, it is obvious that the magnitude of the force applied to the diaphragm varies periodically with the impressed varying voltage, and that this magnitude is proportional to the product of the magnitudes of the steady term and the time varying term. By controlling either or both of these terms, the amplitude of vibration of the diaphragm is controlled. In other words, the magnitude of the product of the D.C. bias voltage and the A.C. drive voltage required for a given amplitude is directly proportional to the power required to overcome the damping in the transducer. With a fixed D.C. bias voltage and a fixed amplitude of vibration, the A.C. voltage is used directly as a measure of the power absorbed by the gas. The range of the transducer is varied by changing the D.C. bias voltage level as well as by changing the diaphragm displacement amplitude. Calibration results are conveniently expressed in terms of the product of the two voltage components, divided by the diaphragm amplitude. Automatic operation may also be provided as will hereinafter be discussed.

In the case where the constant voltage is zero, the force appearing on the diaphragm 10 results only from the square of the time varying voltage appearing on the forcing plate 15. Therefore, the force appearing on the plate 15 contains a steady term and a term which varies in magnitude at twice the rate of the variation in the magnitude of the imposed voltage. In this case, the frequency of the voltage variation impressed on the plate 15 is varied at one half of the resonant frequency of the mechanical system. This voltage also could be varied to control the amplitude of vibration of the mechanical system.

On the other hand, a variable voltage may be impressed simultaneously on both stationary plates 15 and 16. This voltage is caused to vary at a freequency twice that of the diaphragm displacement. While the forces introduced by the two plates tend to be opposite in direction, the diaphragm approaches each plate periodically, thus causing the force exhibited by that closer plate to exceed the counteracting force due to the more distant plate.

Any of these control voltages may vary to maintain a constant displacement amplitude of the vibrating diaphragm 10, under varying pressure or density conditions; and, by maintaining a constant amplitude of vibration, gas pressures or densities are reflected by the change in voltage required to drive the diaphragm.

As described above, the preferred method of measuring the pressures or densities of the gaseous environment is to drive the vibrating diaphragm at a constant vibrational amplitude at the resonant frequency of the system, and use the driving voltage as a measure of the pressure by relating this to the various parameters involved. However, other methods of operation are available. For example, the control voltage may be varied to maintain a constant displacement amplitude, as above, and pressure measurements over a lesser, but moderate range made with the transducer utilizing the variation in frequency with pressure. For example, referring again to FIGURE 1, wherein the frequency indicator 21 operated as a tuning device for determining when diaphragm 10 was at its resonant frequency, it can be seen that, by making various minor adjustments, the frequency indicator 21 is used as a measure of the pressure by relating a change in frequency of the system at a constant vibrational amplitude to the pressure of the surrounding gas.

It may also be noted that the vibrating diaphragm transducer covers an extremely large range of pressures, which heretofore required the employment of a number of gauges to cover the same range. Thus, the advantages of the present invention are manifest. This invention is relatively rugged; cannot be damaged by excessive pressure; has a wide measuring range; measures pressure without requiring a vacuum or other pressure differential reference; is small enough in active volume to provide fast time response at low pressures; and lends itself readily to automatic operation.

Furthermore, this invention will lend itself to several interesting applications in various degrees. For example, damping introduced by the motion of the diaphragm through a magnetic field and the resulting effects of eddy currents may be measured by a suitable change in the techniques and materials of construction. In this case, the characteristics of the vibrating diaphragm 10 are modified by magnetic or electrostatic fields. The motion of the diaphragm through a magnetic field produces damping forces which are measured in the manner described above, and the magnitude of these forces is related to the properties of the magnetic or electrostatic fields, for measuring the same. Another example is an evacuated transducer driven by a sinusoidal voltage at the diaphragm resonant frequency used to measure the voltage developed by a small current, such as that produced by an ion chamber. Here the ionic fluid is directly accelerated by the action of an electric or magnetic field and the force imparted to the vibrating diaphragm 10 by the accelerated ionic fluid is used to measure the properties of that fluid. Thus, ionic sources may be measured or gaseous fluids may be ionized and later accelerated by the action of an electric or magnetic field. The momentum transfer of the ions to the vibrating diaphragm 10 is then related to the density or pressure of the ionized fluid. Estimates based on preliminary results indicate sensitivities somewhat greater than $10^{-18}$ amperes can be obtained with time constants less than a hundred seconds, and probably less than ten seconds. Pressure measurements over a moderate range may also be made with the transducer utilizing the variation in frequency with pressure. For example, an extremely small (.28 inch) diametered transducer is used to perform adequately over a very wide range, and, because of the high frequency of the small vibrating diaphragm contained therein, pressure may be measured independently of the medium with the proper choice of spacing. Other obvious variations in the geometry and the drive mechanism employing the dynamic principles disclosed herein will allow other new and intriguing applications.

Figure 3:
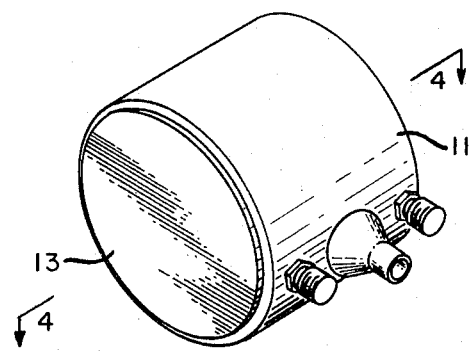
FIGURE 3 is a perspective view of the exterior of a gauge of the type shown schematically in FIG. 1.
Figure 4:
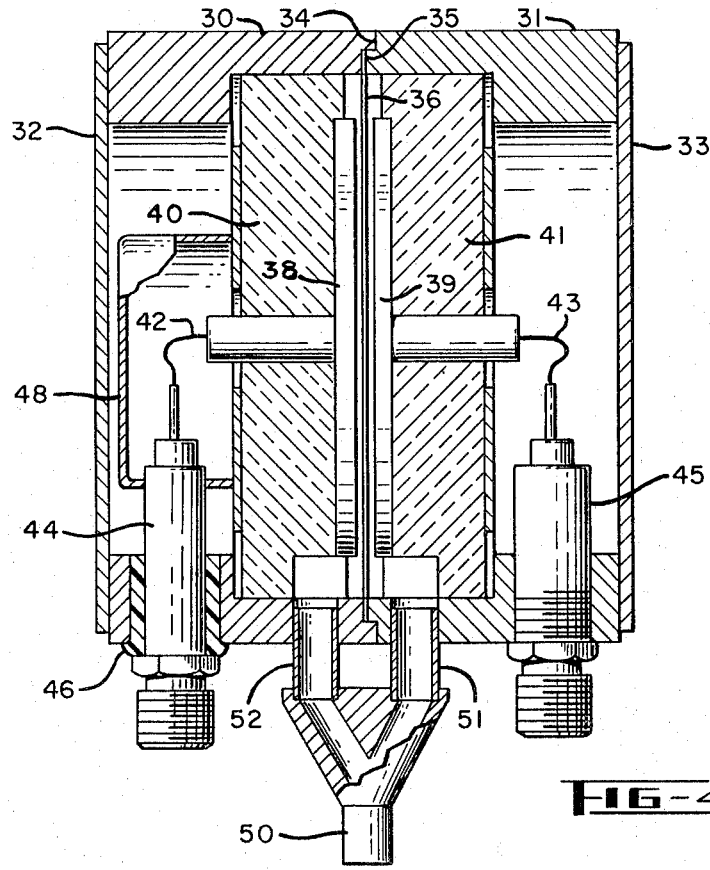
FIGURE 4 is a cross-section of the present invention as taken in a plane through line 4—4 of FIGURE 3.

Referring to FIGURE 3, there may be seen a more detailed, three dimensional view of one embodiment of the present invention, the drawings of which may be considered to approximate the actual size of one working model of the transducer herein. In FIGURE 4, there is shown a transducer defined by two hollow, cylindrical casings or tubes 30 and 31, each being respectively sealed at one end by two round discs 32 and 33. These components are preferably made of Kovar steel, welded or soldered together. The open ends of each tube are provided with a groove 34 and 35 along the inside and outside circumference of the tubes 30 and 31, respectively, for tightly fitting the casings axially together and for holding the annular, vibrating diaphragm 36 radially suspended by the seam created by such a fitting, as shown. This seam is secured by any suitable attaching means. For example, clamps, set screws, soldering or welding may be employed. But it is to be noted that welding the seam is the preferable since a sturdy air tight seam, unaffected by temperature changes will be thereby provided. Thus, the diaphragm 36 is rigidly and radially suspended, and is free to vibrate along its central axis. Vibration of the diaphragm 36 is at the resonant frequency of the system, including the surrounding gaseous environment, and this vibration is maintained by the driving voltage impressed upon the driving plate 38, which is rigidly embedded into an insulating, supporting mass 40, preferably made of glass. The driving plate 38 is connected to the voltage source, not shown, through a small lead wire 42 and an electrical connector 44, which is insulated from the housing tube 30 by any suitable insulation 46, as shown in FIGURE 4. Metal cup 48, attached to connector 44, provides additional shielding for lead 42 and may be omitted if desired.

Once the diaphragm is vibrating at a constant amplitude, the pressure of the surrounding gas is measured by attaining a constant diaphragm amplitude. The voltage of the driving plate 38 is varied, as described above, and this variance in voltage is related to the property to be measured.

Any change in amplitude or any change in frequency of the diaphragm 36 will be detected by appropriate signals relayed to the displacement and frequency indicators, as hereinbefore described. For this purpose, a sensing plate 39 is placed near the other side of diaphragm 36 and is similarly embedded in an insulating mass 41, which is also preferably made of insulating glass. The sensing plate 39 transmits electrical signals, for example, by measuring the rate of change of capacitance, to the appropriate indicators, through a small lead wire 43 and a second electrical connector 45, which is insulated from casing 31 by any suitable insulating material (not shown). These signals are received by a diaphragm displacement indicator and a frequency indicator, which aid in fixing the dynamic properties of the vibrating diaphragm. These dynamic properties are then employed as parameters with the time varying, driving voltage to determine the density or pressure of the gaseous medium to be measured, which may be air.

Thus, when air is passed through an inlet 50, it will enter both sides of the diaphragm through "Y" shaped connecting tubes 51 and 52. The voltage impressed upon the forcing plate vibrates the diaphragm at a constant amplitude, and, by relating the amount of voltage required to drive the vibrating diaphragm at this constant amplitude, the pressure or density of the gas is directly measured.

Figure 5:
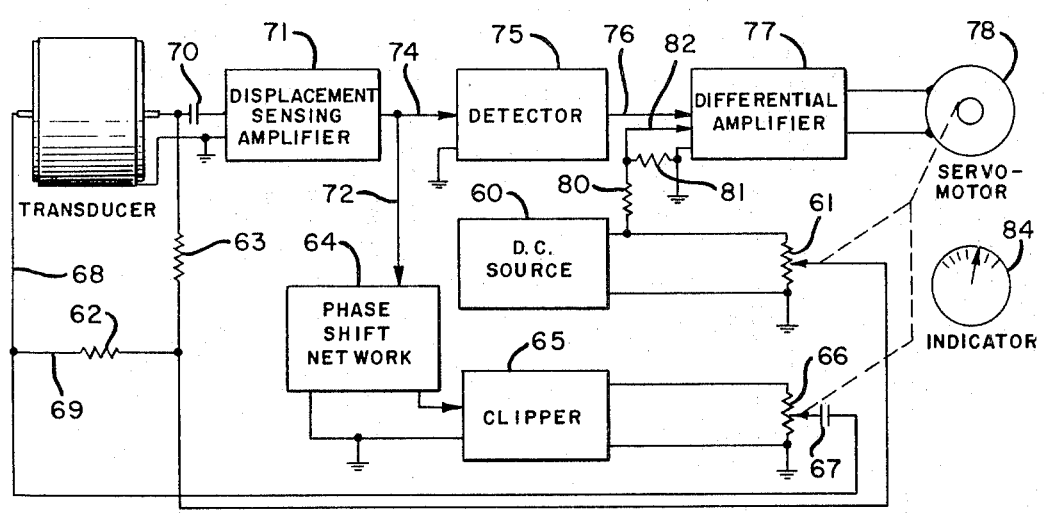
FIGURE 5 is a schematic representation showing the transducer of FIGURE 3 and one embodiment of the various electrical elements that may be used therewith.

The voltage of the driving disc 38 may be manually adjusted, however, automatic operation is preferable, and one preferred embodiment providing automation of this system is illustrated in FIGURE 5. FIGURE 5 shows a block diagram representing electrical equipment designed to give a rapid, remote dial indication of pressure over an expanded pressure range. In this arrangement, the displacement of the diaphragm causes a capacitive change across the capacitor formed by the moving diaphragm and the sensing plate, which in turn causes a change in voltage in the circuit of the displacement sensing amplifier. This change in voltage is amplified, shifted in phase, and returned to the driving plate of the transducer in such a manner as to cause oscillation of the diaphragm at the resonant frequency of the system. For this purpose, a source 60 of D.C. current is connected through the D.C. potentiometer 61 and the resistors 62 or 63 to the driving and sensing plates, respectively, to provide the required minimum D.C. biasing potential. The driving A.C. voltage is supplied from the phase shift network 64 and is transmitted through a clipper 65, a clipper potentiometer 66 and a capacitor 67 to the driving and sensing plates. The lead 68 to the driving plate is relatively non-resistive and offers a low impedance to current flow, permitting a relatively strong signal at the driving plate. On the other hand, the lead 69 to the sensing plate is highly resistive, having resistors 62 and 63 therein. Thus, by using a high frequency oscillating A.C. voltage, very little A.C. current is impressed on the sensing plate, so that a relatively pure, undistorted A.C. voltage is applied to the driving plate. Changes in voltage between the diaphragm and sensing plate, which are caused by the diaphragm displacement, are electrically transmitted across capacitor 70 to a displacement sensing amplifier 71. Once amplified, this signal travels through lead 72 to the phase shifting network 64 and the clipper system 65 for synchronization and feed-back through the variable clipper potentiometer 66, and the capacitor 67, to the driving and sensing plates. This will cause continuous, automatic and constant oscillation of the diaphragm at the system's resonant frequency, as described above.

The output voltage of the displacement sensing amplifier 71 is also rectified and compared by a differential amplifier to the D.C. source, which is used as a reference voltage. Accordingly, this output voltage is transmitted through lead 74, a detector 75, and the detector output lead 76 to the differential amplifier 77, the leads of which are connected to a servomotor 78, as shown. As well as providing the minimum D.C. biasing voltage at each plate, the direct current biasing voltage is also maintained for comparison to the voltage received by the differential amplifier 77. To accomplish this, the output leads of the D.C. voltage source 60 are connected across the D.C. potentiometer 61, leading to the sensing and driving plates, as described above; and this D.C. reference voltage is also fed into the differential amplifier through resistors 80 and 81 and lead 92, as shown in FIGURE 5.

The D.C. reference potentiometer 61 and the clipper potentiometer 66, together with the input of an indicator dial 84, are mechanically connected to the output of the servomotor 78, as indicated by the phantom lines in FIGURE 5. The change in amplitude of the vibrating diaphragm causes a difference in voltage to appear at the input of the differential amplifier 77, which causes the associated servomotor 78 to rotate the two potentiometers 61 and 66 for reducing or increasing the bias voltage applied to both the driving and sensing sides of the transducer and the oscillating voltage applied to the driving side. Thus, these voltages are controlled to maintain the rectified displacement voltage equal to the reference voltage, so that indicator 84 reads the pressure or density directly.

Reduction of the bias voltage applied to the sensing plate necessitates an increase in displacement amplitude, so that the displacement signal equals the reference voltage. Thus, the system produces a greater diaphragm amplitude when lower pressures are measured and produces a smaller diaphragm amplitude when measuring greater pressures. Since the electrostatic driving power applied to the diaphragm is proportional to the product of the magnitudes of the constant bias voltage times the variable or oscillating voltage, and since the input voltage to the displacement sensing amplifier calls for displacement inversely proportional to the bias voltage, the rotation of servomotor 78 is approximately proportional to the cube root of the pressure. This cube root relationship between the motion of servomotor 78 and the pressure within the transducer provides an extremely wide operational range for the pressure indicator 84.

Figure 6:
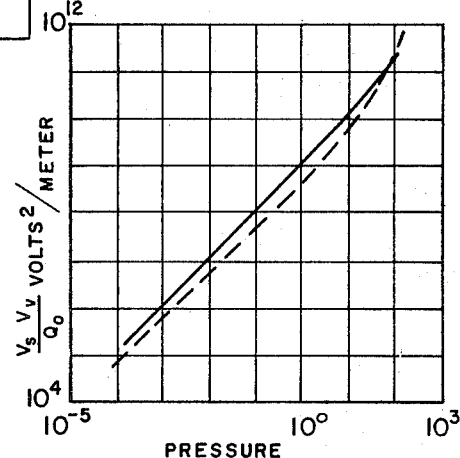
FIGURE 6 is a graph wherein the force on the diaphragm driving element is plotted against the measured pressure of two different gaseous environments.

In FIGURE 6 there is shown a graph wherein the product of the voltage components divided by the measured amplitude is plotted as a function of pressure in millimeters of mercury for one particular pressure transducer. The solid line represents the pressure reading taken in an atmosphere of helium, and the dotted lines represents the value of pressures measured in an atmosphere of air. It is to be noted that in actual practice the measured pressure coincided with theory exceedingly well. The transducer was also calibrated with argon, and the results were very similar to those presented for air, except that argon required approximately 10% less power than air over most of the range shown. FIGURE 6 shows the plotted results taken at approximately 70° F. One transducer, however, was also calibrated in air in the pressure range from $10^{-3}$ to 100 millimeters mercury at 135° F. and the results did not deviate significantly from the curve plotted for air. The transducer herein has also been operated adjacent to a very intense magnetic field without any appreciable reading errors being introduced by the effects of the magnetic environment.

It should be noted then transducers may be constructed to allow for performance as a function of several other parameters in addition to those mentioned above. For example, the invention may be constructed with gas inlets at the center of the stationary plates, and the size of the air inlet orifices may be decreased or even porous plugs inserted therein. Working models of these embodiments of this invention have been constructed, and it was expected that these modifications would have altered the boundary conditions considerably. However, the measured performance of these transducers was not significantly changed. In addition, another embodiment of this transducer was constructed with the stationary plates curved so that the pressure gradient with respect to the radius and hence the viscous loss due to the radial flow was minimized. In measuring the effect of this modification, it was noticed that the driving power required to operate the transducer was only one fourth of the driving point for a standard transducer.

In the type of transducer shown and discussed thus far, the vibrating member is in the form of a diaphragm held stationary around its entire periphery. A modified embodiment will now be described in which the vibrating member is held stationary along only a relatively small portion of its periphery. More specifically, the vibrating member of the modified embodiment is preferably a strip or ribbon-shaped piece of metal held stationary only at its ends.

Figure 7:
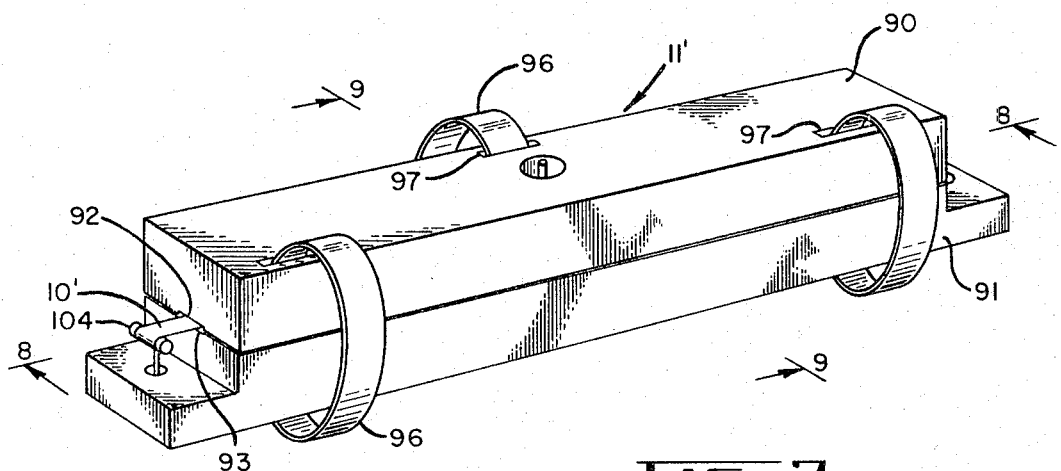
FIGURE 7 is a perspective view of the exterior of another embodiment of the invention wherein the vibrating member is a ribbon instead of a diaphragm.
Figure 8:
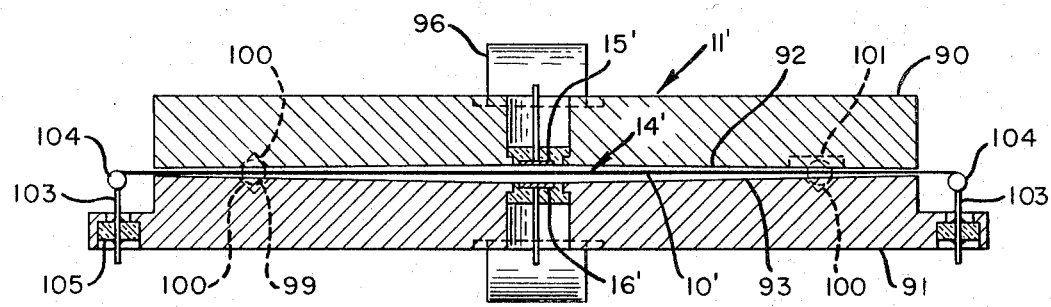
FIGURE 8 is a cross-sectional view taken on the lines 8—8 of FIGURE 7.
Figure 9:
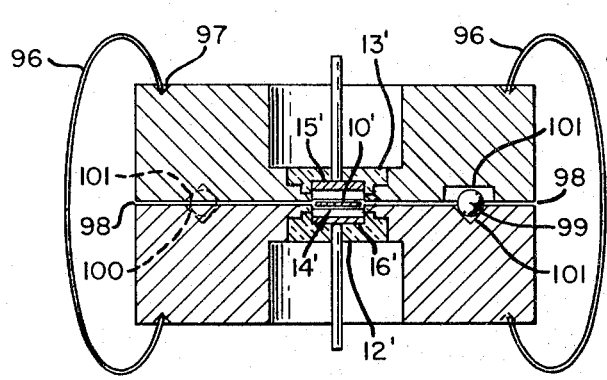
FIGURE 9 is an enlarged cross-sectional view taken on the line 9—9 of FIGURE 7.
Figure 10:
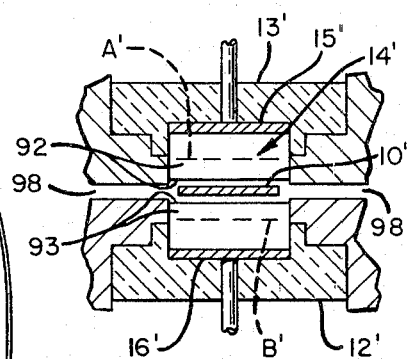
FIGURE 10 is an enlarged view of the center portion of FIGURE 9.

Reference will now be made to FIGURES 7–10 wherein primed reference numbers will be used to designate parts which are similar to parts shown in FIGURES 1 and 2. The embodiment of FIGURES 7–10 comprises a sensing element 10′ which is in the form of a long strip or ribbon preferably of metal. The ribbon 10′ is mounted in a casing 11′ which forms a cavity or chamber 14′ in which the ribbon is mounted for vibration between two extreme positions represented by the dash lines A′ and B′ in FIGURE 10. As in the embodiment of FIGURE 1, the sensing element in the embodiment of FIGURE 7 is vibrated by electrostatic forces applied between the ribbon 10′ and a stationary metal driving plate 15′. Also as in the case of FIGURE 1, the motion of ribbon 10′ of the embodiment of FIGURE 7 is measured by measuring the capacitance between the ribbon and a stationary metal sensing plate 16′. The metal plates 15′ and 16′ are held in place by insulating disks 13′ and 12′, respectively.

In more detail, the casing 11′ of the embodiment of FIGURES 7–10 comprises a top plate 90 and a bottom plate 91. Both of the plates are preferably made of metal, such as Kovar. The top plate is provided with a groove 92 along the length of its lower surface. Similarly, the bottom plate 91 is provided with a groove 93 along the length of its upper surface. When the plates 90 and 91 are placed together the grooves 92 and 93 cooperate to form the chamber 14′. Each of the grooves is preferably tapering in depth from deep at its center to shallow at its ends. The specific shape of the taper is selected so that the top and bottom of chamber 14′ will be substantially similar in shape to the curve of the ribbon 10′ at the extremes of its vibratory displacement. It will be understood that the ribbon 10′ is never vibrated strenuously enough to strike the top and bottom walls of chamber 14′.

The plates are held in assembled relation to each other in any suitable manner. For example, a plurality of spring clamps 96 serves very well. The ends of the clamps snap into place into shallow grooves 97. In order to allow the chamber 14′ to be connected throughout its length to the surrounding gas to be tested, the top and bottom plates are held slightly separated to provide a continuous communication channel or spacing 98 on each side of the chamber 14′. The spacing between the top and bottom plates is made very small so that chamber 14′ is actually a relatively closed chamber as in the case of chamber 14 in the embodiment of FIGURE 1. Any suitable means can be used to obtain the desired spacing between plates 90 and 91. One particularly satisfactory arrangement is to employ a plurality of spheres 99 received in cone-shaped recesses 100 and linear V-grooves 101. The spheres are oversized for the recesses by the amount desired for spacing 98. The spheres are preferably made of sapphire or other dielectric to insulate the top and bottom plates from each other.

The ribbon 10' is supported in the chamber 14' by means of a post 103 and bar 104 at each end of the casing 11'. The ribbon 10' can be spot welded to the bars 104 which are of course attached to the posts. The posts 103 are mounted on the bottom plate 91 and are held securely in place by dielectric disks 105 so that the ribbon 10' will be insulated from the plates 90 and 91.

The embodiment of FIGURES 7–10 is operated in exactly the same way as the embodiment of FIGURE 1. Thus, the line from the right side of battery 17 in FIGURE 1 would be connected to the driving plate 15'; the ground line from the other side of the battery 17 and from the potentiometer 18 and variable frequency oscillator 19 would be connected to the ribbon 10' by connection to one of the posts 103; and the sensing plate 16' would be connected to the displacement indicator 20. Similarly, if the embodiment of FIGURE 7 is used in the automatic circuit of FIGURE 5, the sensing plate 16' is connected to the displacement sensing amplifier 71 through the capacitor 70; the ribbon 10' is connected to the displacement sensing amplifier 71 through the ground line shown in FIGURE 5; and the driving plate 15' is connected to the line 68 in FIGURE 5. The method of using the embodiment of FIGURES 7–10 is exactly the same as hereinbefore described for the embodiments of FIGURES 1–4, including the circuit arrangements of FIGURES 1 and 5 and the various alternative methods of measuring.

One important aspect of the invention which applies to both the embodiment of FIGURES 1–4 and the embodiment of FIGURES 7–10 is that the sensing members 10 and 10' operate on a relatively small, substantially confined volume of gas. In this way the moving sensing member does substantial work on the gas being tested. In other words, when the sensing members 10 and 10' move in one direction they compress the gas on one side and expand the gas on the other side so that appreciable energy is transferred to the gas and dissipated by heat transfer. Thus, the energy loss caused by the presence of the gas under test becomes a large part of the total energy required to vibrate the sensing member. As a result, the transducer is extremely sensitive to change in the pressure of the gas under test. The described arrangement is to be contrasted to an arrangement wherein the sensing element would be exposed to a relatively large volume of gas. In the latter case, movement of the sensing element would cause no appreciable percentage change in the volume of the gas and relatively little energy would be dissipated in the gas. If the vibrating member were exposed to a large volume of gas, the thermal energy-transfer process would be related to the effects of a radiated compressional wave rather than to appreciable expansion and contraction of the total gas volume.

Thus in the embodiment of FIGURES 1–4, the sensing element 10 is sealed around its entire periphery so that gas cannot flow across it from one side to the other, and in addition the size of the chamber on each side of the diaphragm 10 is made relatively small. In the embodiment of FIGURES 7–10 the sides of the ribbon 10' are close to the adjacent sides of the chamber 14' so that gas cannot pass freely across the ribbon. Some gas will, of course, flow around the edges of the ribbon, but it will be a high velocity flow which will involve substantial heat loss. In addition the gas on each side of the ribbon will be substantially compressed and expanded because the flow around the edges of the ribbon is highly restricted. By way of example, an actual transducer made according to the embodiment of FIGURES 7–10 has a chamber 14' with a maximum size; that is, at the center position (FIGURE 10) of .162 inch deep from top 92 to bottom 93 and .104 inch wide. The width is of course constant throughout the length of the chamber. The communication channels 98 are .002 inch deep, and the space between each side of the ribbon and the adjacent wall of chamber 14' is .002 inch. Thus, it will be seen that the ribbon forms a substantial separation of the chamber into two parts. The ribbon embodiment is desirable because it can be made to vibrate with relatively little energy devoted to the ribbon itself. Thus the sensitivity is high, because the total energy requirement is largely a matter of the amount of energy required by the gas being tested.

It should be understood that this invention in its broader aspects is not limited to the specific examples illustrated and described herein, and the following claims are intended to cover all changes and modifications that do not depart from the true spirit and scope of this invention.

What is claimed is:
1. A device for measuring gaseous environments comprising:
   (a) a structure defining a hollow cavity, and having passage means through which a gaseous environment may enter all parts of the cavity,
   (b) a flexible, vibratory member contained within the cavity, with the gaseous environment being present on all sides of said vibratory member,
   (c) means for driving said vibratory member at resonance and at a constant amplitude, whereby said vibratory member cyclically compresses the gaseous environment present on both sides of said vibratory member,
   (d) driving force detecting means for measuring the force required to vibrate said vibratory member, and
   (e) means for detecting the displacement of said vibratory member.

2. A measuring device as claimed in claim 1 wherein said vibratory member is a diaphragm supported around its entire periphery.

3. A measuring device as claimed in claim 1 wherein said vibratory member is a ribbon supported only adjacent its ends.

4. A device for measuring gaseous invironments comprising:
   (a) a housing assembly defining a cavity and having inlet means for introducing into all parts of said cavity a gaseous atmosphere to be measured,
   (b) a flexible diaphragm peripherally suspended from said housing assembly and contained within said cavity and having both sides thereof exposed to the gaseous atmosphere,
   (c) force inducing means for vibrationally driving said diaphragm,
   (d) sensing means for sensing the dynamic vibrational properties of said diaphragm, whereby the diaphragm displacement is measured and maintained at a particular, constant, vibrational amplitude and frequency,
   (e) detecting means for measuring the frequency of said vibrating diaphragm, whereby the resonant frequency of the system may be detected for optimum operation, and
   (f) force detecting means for measuring the force required to drive said diaphragm.

5. A device for measuring gaseous environments comprising:
   (a) a structure defining a hollow cavity,
   (b) vibratory member suspended within said cavity and forming a substantial separation of said cavity into two parts,
   (c) inlet means for introducing the gaseous environment into said cavity and on both sides of said vibratory member,
   (d) driving means for forcibly driving said vibratory member,
   (e) energy detecting means coupled to said driving means for detecting the amount of energy required to drive said vibratory member,
   (f) amplitude detecting means for determining the vibrational amplitude of said vibratory member, and (g) means coupled to said amplitude detecting means and said driving means for automatically maintaining the oscillation of said vibratory member at a constant amplitude and at the resonant frequency of the system.

6. Apparatus for measuring gaseous environments comprising:
   (a) a vibratory member,
   (b) a housing assembly supporting said vibratory member within a confined cavity defined by said housing assembly, and said housing assembly having passage means for admitting samples of a gas to be measured into the cavity on both sides of said vibratory member,
   (c) an electrostatic driving plate for driving said vibratory member and disposed in close proximity thereto,
   (d) a source of direct current connecting said vibratory member and said driving plate for inducing a constant electrostatic potential difference between said vibratory member and said driving plate,
   (e) a variable frequency, variable-amplitude A.C. voltage source, connecting said vibratory member and said driving plate for inducing a variable potential difference between said vibratory member and said driving plate, for vibrationally driving said member at a fixed, oscillatory amplitude,
   (f) voltage detecting means for detecting the amplitude of said A.C. voltage required to drive said vibratory member and the related system,
   (g) a sensing plate in close proximity to said diaphragm,
   (h) frequency detecting means connected to said sensing plate for measuring the frequency of said vibratory member,
   (i) displacement detecting means connected to said sensing plate for measuring the amplitude of displacement of said vibratory member, and
   (j) said A.C. voltage source being adjusted so that said vibratory member oscillates at a controlled and known amplitude and at the resonating frequency of the system.

7. Apparatus for measuring gaseous environments comprising:
   (a) a vibratory member,
   (b) a housing assembly supporting said vibratory member within a confined cavity defined by said housing assembly,
   (c) said assembly having air inlet means for introducing gas to be measured into the cavity on both sides of said vibratory member,
   (d) a driving plate in close proximity to said vibratory member,
   (e) driving means for driving said vibratory member at resonance and at a constant vibrational amplitude, said driving means having means for applying a constant D.C. potential and means for applying a time varying potential between said driving plate and said vibratory member,
   (f) a sensing plate in proximity of said vibratory member for measuring the displacement of said vibratory member, and
   (g) voltage detecting means for measuring the driving voltage required to drive said vibratory member at a constant, vibrational amplitude.

8. Measuring apparatus as claimed in claim 7, additionally comprising:
   (a) sensing means connected to said sensing plate for producing a voltage, electrostatically established, at said sensing plate,
   (b) a phase shift network connected between said sensing means and said driving plate for feeding signals back into said driving plate proportional to the variations in voltage at said sensing plate,
   (c) a direct voltage source biasing said driving and sensing plates relative to said oscillating member with said D.C. source serving as a reference voltage,
   (d) means for comparing the output of said sensing means with said direct voltage source serving as a reference voltage to produce a difference voltage,
   (e) means responsive to said difference voltage for varying the bias voltage applied to said driving and sensing plates for maintaining a constant amplitude of motion of said oscillating diaphragm, and
   (f) indicating means operated by said difference voltage for indicating variations in density about said vibratory diaphragm.

9. Apparatus for measuring gaseous environments comprising:
   (a) a three-element capacitor having a thin, vibratory member mounted between a fixed driving plate and a fixed sensing plate with connections for admitting gas on both sides of said vibratory member,
   (b) sensing means connected to said sensing plate for producing a voltage proportional to the vibratory displacement of said vibratory member,
   (c) driving means connected between said driving plate and said vibratory member for electrostatically vibrating said vibratory member,
   (d) a phase shift network connected between said sensing means and driving plate for feeding signals back to the driving plate and providing oscillation of the vibratory member at the resonant frequency of the sytsem,
   (e) a direct current voltage source for biasing said driving and sensing plates relative to said vibratory member and for serving as a reference voltage,
   (f) means comparing the output of said sensing means with said reference voltage source to produce a difference voltage,
   (g) means responsive to said difference voltage for varying the bias voltage applied to said capacitory elements for maintaining a constant amplitude of motion of said vibratory member, and
   (h) indicating means operated by said difference voltage for indicating variations in gas pressure about said vibratory member.

10. Apparatus for measuring gaseous environments comprising:
    (a) a housing assembly defining a cavity and having inlet means for introducing into all parts of said cavity a gas to be measured,
    (b) a flexible vibratory member suspended from said housing assembly and contained within said cavity and having both sides thereof exposed to said gaseous environment,
    (c) driving means in close proximity to one side of said vibratory member,
    (d) force inducing means for inducing a driving force upon said driving means for vibrationally driving said vibratory member and causing oscillation thereof at a constant amplitude,
    (e) sensing means in close proximity to the other side of said vibratory member for sensing the oscillatory displacements of said vibratory member,
    (f) means connected between said sensing means and said driving means for oscillating said vibratory member at the resonant frequency of the system, and
    (g) means for measuring the magnitude of said driving force.

11. A device for measuring gaseous environments comprising:
    (a) a structure defining an elongated cavity,
    (b) a ribbon supported under tension in said cavity with the sides of said ribbon closely adjacent the walls of said cavity,
    (c) said structure having passage means for introducing said gaseous environment into said cavity,
    (d) means for oscillating said ribbon at a constant amplitude and at resonance, (e) means for measuring the displacement of said ribbon, and
(f) means for detecting the driving force required to oscillate said ribbon at a constant amplitude.

12. A device as claimed in claim 11 in which said cavity tapers in cross-section from small adjacent the ends of said ribbon to larger adjacent the center of the ribbon.

13. A device as claimed in claim 11 in which said passage means are located in said structure along each side edge of said ribbon.

14. A device for measuring gaseous environments comprising:
(a) a structure defining a hollow cavity, and having passage means through which a gaseous environment may enter all parts of the cavity,
(b) a flexible, vibratory member container within the cavity, with the gaseous environment being present on all sides of said vibratory member,
(c) means for driving said vibratory member at resonance and at a constant amplitude, whereby said vibratory member cyclically compresses the gaseous environment present on both sides of said vibratory member,
(d) means for measuring the amplitude of vibration of said vibratory member, and
(e) means for measuring the magnitude of the vibratory member driving force.

15. A device for measuring gaseous environment comprising:
(a) a casing structure having a top plate and a bottom plate,
(b) said top plate having an elongated groove on its lower surface and said bottom plate having an elongated groove on its upper surface, said grooves cooperating to form a cavity when said plates are placed together,
(c) spacing means separating said top and bottom plates to form passage means to the cavity formed by said grooves,
(d) a ribbon positioned in said cavity and held under tension at its ends,
(e) means for oscillating said ribbon at a constant amplitude and at resonance,
(f) means for measuring the displacement of said ribbon, and
(g) means for detecting the driving force required to oscillate said ribbon at a constant amplitude.

16. A device for measuring gaseous environments comprising:
(a) a structure defining a hollow cavity, and having passage means through which a gaseous environment may enter all parts of the cavity,
(b) a flexible, vibratory member contained within the cavity, with the gaseous environment being present on all sides of said vibratory member,
(c) means for dynamically driving said vibratory member at resonance and at a constant amplitude, whereby said vibrating member cyclically compresses the gaseous environment present on both sides of said vibrating member, and
(d) means for measuring the energy required to overcome the energy dissipated due to the viscous forces acting on the vibratory member, said energy being proportional to the pressure of the gaseous environment.

17. A device for measuring gaseous environment comprising:
(a) a casing structure having a top plate and a bottom plate,
(b) said top plate having an elongated groove on its lower surface and said bottom plate having an elongated groove on its upper surface, said grooves cooperating to form a cavity when said plates are placed together,
(c) spacing means separating said top and bottom plates to form passage means to the cavity formed by said grooves,
(d) a ribbon positioned in said cavity and held under tension at its ends,
(e) means for vibrating said ribbon at resonance and at a constant amplitude whereby said ribbon cyclically compresses the gaseous environment present on both sides of said ribbon, and
(f) means for measuring the energy required to overcome the energy dissipated due to the viscous forces acting on the ribbon, said energy being proportional to the pressure of the gaseous environment.

18. A device for measuring gaseous environments comprising:
(a) a housing assembly provided with passage means for allowing a gaseous atmosphere to enter a caivty defined by said housing assembly,
(b) a flexible vibratory member suspended within the cavity defined by said housing assembly and forming a substantial separation of said cavity into two portions,
(c) driving means for oscillating said vibratory member at the resonant frequency of the system,
(d) means for detecting the amplitude of oscillation of said vibratory member,
(e) automatic means for maintaining the oscillation of the vibratory member at constant amplitude and at the resonant frequency of the system, and
(f) driving force detecting means for detecting the driving force required to drive said vibratory member at said constant amplitude and resonant frequency.

References Cited by the Examiner

UNITED STATES PATENTS

| | | | |
|---|---|---|---|
| 2,447,817 | 8/1948 | Rieber | 73—398 |
| 2,800,796 | 7/1957 | Westcott et al. | 73—24 |
| 3,008,014 | 11/1961 | Williamson et al. | 179—111 |
| 3,100,390 | 8/1963 | Banks | 73—67.1 |

OTHER REFERENCES

Janssen: Abandoned application Serial No. 136,212, published October 28, 1952.

RICHARD C. QUEISSER, *Primary Examiner.*

L. R. FRANKLIN, *Assistant Examiner.*